No. 770,929. PATENTED SEPT. 27, 1904.
T. W. SALING & J. B. McKIEL.
BEAMLESS BRAKE.
APPLICATION FILED DEC. 2, 1903.
NO MODEL. 2 SHEETS—SHEET 2.
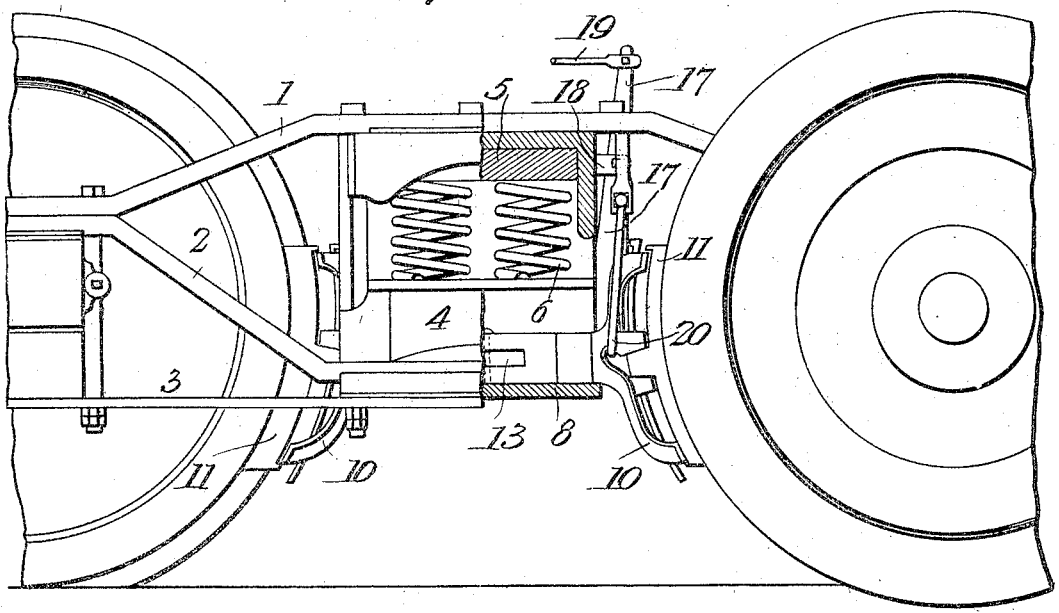
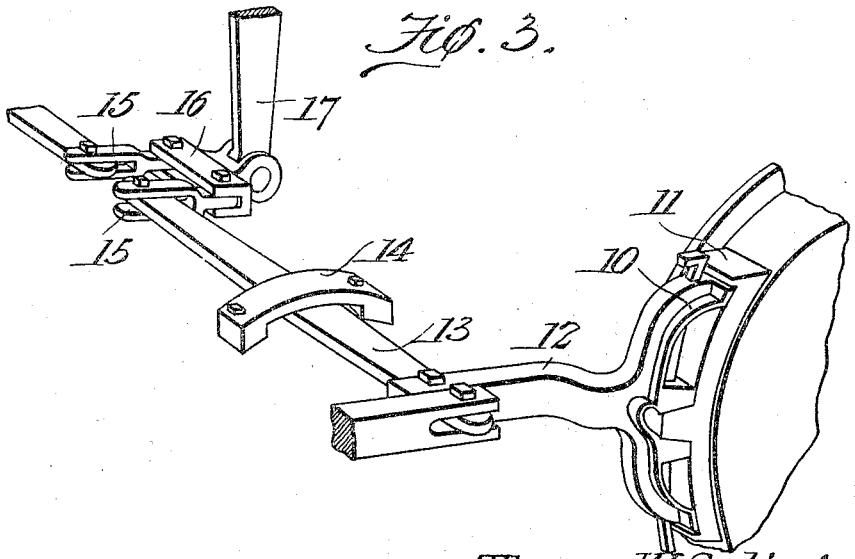
Witnesses
Thomas W. Saling and
James B. McKiel, Inventors No. 770,929. Patented September 27, 1904.

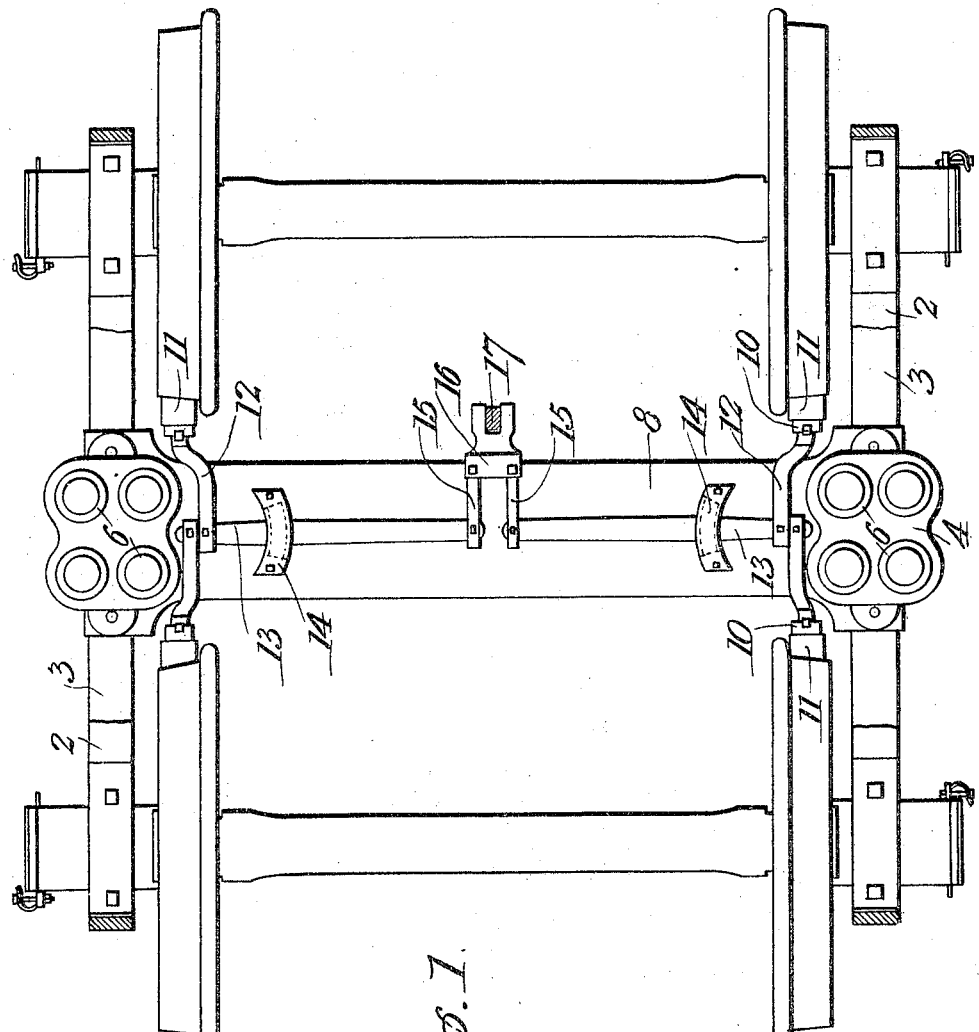

UNITED STATES PATENT OFFICE.

THOMAS W. SALING AND JAMES B. McKIEL, OF MARSHALL, TEXAS.

BEAMLESS BRAKE.

SPECIFICATION forming part of Letters Patent No. 770,929, dated September 27, 1904.

Application filed December 2, 1903. Serial No. 183,513. (No model.)

*To all whom it may concern:*

Be it known that we, THOMAS W. SALING and JAMES B. McKIEL, citizens of the United States, residing at Marshall, in the county of Harrison and State of Texas, have invented a new and useful Beamless Brake, of which the following is a specification.

This invention relates to certain improvements in railway-brakes of that general class in which brake-beams are dispensed with, the brake-heads being connected independently to the operating-levers.

The principal object of the invention is to provide a brake in which the parts shall be few in number and of the most simple and economical character, so that they may be installed and maintained at slight expense.

A further object is to provide a brake of this character in which the pressure of the shoes on adjacent wheels is equalized, the same degree of force being exercised on all of the wheels of a truck.

A further object of the invention is to provide a novel form of supporting means for holding the brake heads and shoes in proper position with respect to the wheels.

With these and other objects in view, as will hereinafter appear more fully, the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a sectional plan view of a truck provided with a beamless brake arranged and constructed in accordance with the invention. Fig. 2 is a side elevation of the same, partly in section. Fig. 3 is a detail perspective view of a portion of the brake.

Similar numerals of reference are employed to indicate corresponding parts throughout the several figures of the drawings.

In the drawings there is shown a truck in many respects resembling that ordinarily used and including upper and lower arch-bars 1 and 2, tie-bars 3, a spring-plank 4, and bolster 5. The spring-plank 4 is connected to the lower arch-bar in the usual manner and extends thereabove in order to form a seat for the springs 6. To the under side of the arch-bar and between such bar and the tie-bar is arranged a plate or strip 8, that in part forms a support and guide for the brakes and brake-operating mechanism.

The brake-heads 10 carry shoes 11 of any ordinary construction, and extended rearwardly of each brake-head is a shank member 12, that is preferably formed integral with the brake-head and is supported by the plate 8 at a point below the spring-plank. In a four-wheeled truck two brake shoes, heads, and shanks are arranged at each side of the car, and the inner ends of the shanks are bifurcated for the reception of one end of an operating-lever 13. This lever extends through a guide 14, formed by a segment that is secured at its opposite ends to the upper side of the plate 8, and when the opposite end of the lever is moved its fulcrum is formed at a point intermediate of the pivotal connections of the two shanks with the lever, so that said shanks will be moved, respectively, in opposite directions to force their brake-shoes into contact with the wheels. The two levers 13 are extended inward toward the median longitudinal line of the truck and are independently connected by links 15 to a bifurcated link 16, the outer end of which is connected to the lower end of a truck-lever 17. The truck-lever 17 is pivoted to a bracket 18 and at its upper end is connected by a rod 19 to the brake-applying mechanism, which may be of any desired character.

When the truck-lever 17 is operated, its movement will be transmitted, through the links 16 and 15, to the adjacent ends of the brake-levers 13, and the latter will be turned on fulcrums disposed intermediate of the shanks of each pair of brake-heads, movement of one being resisted by the pressure of the brake carried by the other, so that the pressure exerted on adjacent wheels will be uniform, the braking force being automatically equalized without regard to difference in wear of the brake-shoes or wheels. As the parts are connected together in such manner as to prevent any lost motion, application of the brakes will be certain and positive, while movement of the brakes from proper position will be prevented on one side by an auxiliary plate 8 and on the opposite side by the bottom of the guides 14.

The usual brake-hangers may be dispensed with, but as a matter of precaution may be arranged in the usual manner, as indicated at 20 in Fig. 2.

Having thus described the invention, what is claimed is—

1. In combination, a brake including a spring-plank, a plate arranged below the spring-plank, brake-shoes arranged in pairs at each side of the car, brake-heads carrying the shoes, shanks connected to the brake-heads and resting on said plate, the rear ends of the shanks being offset and arranged side by side in close relation, brake-levers each having one end pivotally connected to a pair of shanks, and the pivotal connection of one forming the fulcrum for the operable movement of the other, and guards secured to the plate and serving as supports for said levers, substantially as specified.

2. In combination, a brake including a spring-plank, a pair of brake-shoes at each side of the car, brake-heads carrying the shoes, a shank rigid with each brake-head, a plate carried by the brake and forming a support for the shanks, a pair of brake-operating levers arranged loosely below the spring-plank, one end of the lever being pivotally connected to a pair of shanks and the pivotal connection of one shank forming a fulcrum for operable movement of the other shank, bracket-guards carried by the plate and serving to limit the movement of the levers, a pivoted brake-lever, a link pivotally connected to said lever, and secondary links connecting the brake-levers to said link, substantially as specified.

In testimony that we claim the foregoing as our own we have hereto affixed our signatures in the presence of two witnesses.

THOMAS W. SALING.
JAMES B. McKIEL.

Witnesses:
J. B. JONES,
I. R. WILLIAMS.